Jan. 9, 1962 A. G. BODINE 3,016,095
SONIC APPARATUS FOR FRACTURING PETROLEUM BEARING FORMATION
Filed Jan. 16, 1959

INVENTOR.
ALBERT G. BODINE
BY
ATTORNEY

United States Patent Office 3,016,095
Patented Jan. 9, 1962

3,016,095
SONIC APPARATUS FOR FRACTURING PETROLEUM BEARING FORMATION
Albert G. Bodine, 13120 Moorpark St., Sherman Oaks, Calif.
Filed Jan. 16, 1959, Ser. No. 787,252
4 Claims. (Cl. 166—177)

This invention relates generally to petroleum well treatment and more particularly to improvement of production from earthen petroleum reservoirs of low permeability by fracturing the petroleum bearing strata. The present invention accomplishes this purpose by use of acoustic waves of such extreme power as to cause the formation to undergo a periodic stress beyond its elastic endurance limit and to fail by elastic fatigue. This application is a continuation-in-part of my parent application Serial No. 437,078, filed June 16, 1954, allowed May 9, 1958, now Patent No. 2,871,943.

An oil reservoir in the ground is simply a region of porous oil-soaked rock or sand. Formation porosity refers to the total volume of voids in which oil may accumulate. Permeability refers to the ability of the formation to permit oil flow therethrough. Small pore size, and especially the absence of good joining channels between pores or voids, results in low permeability. Permeability largely determines the daily oil production rate of the well, and to a considerable degree determines how long the well will have a reasonable daily production.

A great many attempts have been made to increase artificially the production rate from a low permeability formation around a well bore. A number of these, and their limitations were mentioned in my said parent application, including the relatively recent process known as hydraulic fracturing; and said application is incorporated herein by reference for purpose of discussion of these prior procedures.

The general object of the present invention is the provision of apparatus involving the application of high intensity acoustic waves to fracture low permeability rock, provide new exposure area, and open up new drainage channels to the well.

Rock material will of course transmit acoustic (elastic) waves, and will continue to do so indefinitely at ordinary wave amplitudes, such as are set up with certain prior processes used for various purposes. In such elastic wave transmission, alternating deformation waves of compression and expansion travel through the rock. I have discovered that if the pressure amplitude of such alternating deformation waves is very materially raised to a certain threshold level, the rock is then "cyclically overstressed," and under such conditions, fatigue failure and resulting cracking of the rock occurs within a finite time period. I have found that there is a threshold value of acoustic wave pressure amplitude for any given rock, and set of local conditions surrounding the same, at which the rock is stressed beyond its strength or endurance limit, and if the wave is maintained at such amplitude, fatigue failure and fracturing will ensue. Beyond such threshold value, fatigue failure occurs more promptly with higher and higher wave amplitudes. The present process, claimed broadly in my said application Serial No. 437,078, is based on my discovery that acoustic waves established in the formation at or above a certain threshold value place the rock media under more cyclic stress than its physical cohesive properties or tensile strength can endure, sometimes referred to herein as overstressing the rock, and that under such conditions the rock proceeds to fracture by the process of fatigue failure. It will further be understood that the expression "acoustic" is used herein in its technical meaning as understood by those skilled in the art, without implied limitation to the audible frequency range.

Sedimentary rocks are made up of successive relatively thick beds or strata of differing composition, such as sandstone, sand, clay, shale, limestone, etc. These thick beds usually reveal a large number of bedding planes. Thus a given bed, e.g., a sandstone, will ordinarily be composed of successive layers laid down under differing conditions, often separated by bands of clay, shale, or other material. The boundaries between successive beds of differing composition constitue planes of easiest separation, along which cracks or fractures may sometimes develop naturally, and which are most easily opened up by various so-called fracturing procedures. The successive layers are kept normally under high compression by the weight of the over burden. An aim of the present invention is to periodically elastically move or "work" these highly compressed and initially bonded layers, causing them to "fracture" and/or separate by subjecting them to extreme periodic elastic deformation stresses under the influence of powerful acoustic waves transmitted to and through them from a powerful acoustic wave radiator positioned in the bore hole. The fracturing can take place in either or both of two ways, first, separation and relative displacement of adjacent beds or layers, which of course means fracture of the bond between adjacent layers, and second, fracturing of homogeneous beds by cyclic overstress of the formation to the point of fatigue failure. The acoustic waves will, in such manner, also result in vertical cracks due to the stress geometry of a vertical bore.

According to the invention, the acoustic waves are transmitted from the sonic wave radiator to the formation via a body of coupling liquid maintained in the well bore, preferably under a suitable hydraulic pressure. This coupling liquid contacts both the radiator and the formation, and enters all available cracks, fissures and fractures therein, so as to provide a liquid wave transmission medium between the radiator and all exposed surfaces of the formation. This coupling liquid has a specific acoustic impedance $\rho c$ (where $\rho$ is density and $c$ is the velocity of sound) which, while not as high as that of the formation, is nevertheless high enough that a large percentage of the wave energy transmitted through it to the formation is transmitted on into the formation. Some of the wave energy is of course reflected at the surface of the formation. At this reflecting boundary, a stress or pressure cycle is set up, acting to periodically move or reciprocate the surface of the formation through a definite displacement amplitude. Such cyclic movement of a bounding surface of the formation launches alternating elastic deformation waves which are propagated on through the formation with the speed of sound. Assuming a cyclic stress of sufficient magnitude at the point of incidence of the acoustic wave on the formation, and/or waves transmitted in the rock which are of sufficient magnitude to cyclically over-stress the rock, the rock material is subject to fatigue failure and fracture. Fracturing at the boundary planes between adjacent strata, with consequent loosening and separation of strata, is also produced. For example, the characteristic acoustic impedance of sedimentary rock has a marked discontinuity at the boundary planes between different strata, and at such planes, therefore, acoustic waves in the formation are substantially reflected rather than being fully transmitted into the adjacent strata. Accordingly, a given stratum within which a powerful sound wave is being propagated will undergo cyclic elastic deformation movements relative to adjacent strata, thus creating cyclic forces between strata which exceed the strength of the bond therebetween, thereby causing fractures along these bounding planes. Also, assuming the case of waves set up in two adjacent strata of different acoustic impedance, the waves will travel at differing velocities, and the resulting phase difference on opposite sides of the bounding plane results in cyclic shearing forces which exceed the strength of the bond between the strata and thereby cause fracture or separation.

With respect to the above-mentioned acoustic coupling liquid, it is very important that contact with the formation to be fractured be attained and that the liquid be made to follow up changes in geometry as fractures are generated, because the transmission of acoustic fracturing energy to the formation depends upon the presence of the liquid body. It is generally desirable to the accomplishment of this function that the coupling liquid be maintained under a considerable hydraulic head. The necessary pressure can often be attained by the hydrostatic head of a column of liquid filling the well hole to the ground surface. If such hydrostatic head proves to be inadequate, additional pressure can be applied by means of a suitable pressure source at the ground surface.

Assuming a hydrostatic head on the coupling liquid, as described, a pressure wave is radiated into the liquid, and it will be seen that this pressure wave will be superimposed on, i.e., will comprise alternative positive and negative pressure half cycles relative to, the maintained mean hydrostatic pressure. Maintenance of the coupling fluid under hydraulic pressure, as mentioned above, is also important from an acoustic standpoint, since the higher the mean pressure of the coupling liquid, the greater will be the amplitude of the acoustic waves transmitted through the liquid. The sound wave is thus transmitted to the exposed wall surfaces of the formation, to be thence propagated through the formation. Within the formation, the sound wave involves alternate positive and negative pressure half-cycles relative to the compressive pressure normally existing within the formation owing to the overburden.

A characterizing feature of the invention is the development of elastic or acoustic wave cycles of sufficient wave-pressure amplitude to equal or exceed the magnitude which I define as "acoustic formation-failure stress amplitude." Within the coupling liquid and at the formation wall surface, this amplitude is that which will elastically vibrate the formation sufficiently to overstress it and cause it to fail by elastic fatigue. Within the formation, this amplitude is that which is sufficient to overstress the formation and cause it to fail or fracture by elastic fatigue. Thus, the acoustic waves impinging upon and/or transmitted through the formation subject the formation to a cyclic elastic stress, and when this stress is of sufficient magnitude, defined herein as "acoustic formation-failure stress amplitude," the rock is cyclically stressed beyond its fatigue strength at a frequency of many times per second, and fails or fractures as the inevitable consequence.

The feature of the foregoing paragraph may also be expressed, and the threshold limit of the present invention demarked, in terms of the "endurance limit" of the material. This expression is used by engineers to denote the maximum repetitive stress that a material will withstand indefinitely without fatigue failure, and I have found that the same concept is applicable in explaining the present invention. According to this concept, the previously-defined acoustic formation-failure stress amplitude denotes a repetitive stress which exceeds the so-called endurance limit of the material. A plotted curve using repetitive stress amplitude as ordinates, and life (in cycles) to fatigue failure as abscissa, is convex downwardly and becomes horizontal or substantially so at some value of repetitive stress. This particular stress value, called the endurance limit, is taken as the value of indefinite life. The condition for the present invention is then the use of an acoustic wave of amplitude creating a repetitive stress in the structure to be fractured in excess of such value for indefinite life. Obviously, of course, it is preferable to exceed the endurance limit for the material rather substantially so that the desired fatigue failure will occur with reasonable rapidity. This in turn demands a very powerful acoustic wave generator, and a wave radiator having a large energy delivery rate, and a high output or radiation impedance, i.e., a high ratio of force to velocity at the point of drive of the liquid and formation. The apparatus of the invention, to be described presently, inherently possesses such characteristics.

The fracturing effect of powerful acoustic waves of high amplitude and high energy density may be understood by considering the extreme accelerations imparted to the coupling liquid and the formation. Taking the idealized case of a plane wave radiator (for the sake of mathematic simplicity) and investigating the acceleration "$a$" which will be given to the particles of an adjacent body of coupling liquid by such wave, there exists the relation $$p = \rho c u$$

where $p$ is the pressure amplitude of the wave, $\rho c$ is the characteristic acoustic impedance per unit area for the medium ($\rho$=density, $c$=speed of sound), and $u$ is liquid particle vibration velocity. The particle acceleration $a$ is related to particle velocity $u$ by $$a = \frac{du}{dt} = \omega u$$

where (assuming a sinusoidal wave) $\omega = 2\pi$ times frequency. Then $$a = \frac{\omega p}{\rho c}$$

Assuming a wave radiator capable of generating a pressure wave of amplitude typical of the invention, e.g., $p = 50$ atmospheres $= (50 \times 10^6$ dynes/cm.$^2)$ $\rho c = 1.4 \times 10^5$ cgs. units, and $f = 100$ c.p.s., and substituting, we find $a = 22 \times 10^4$ cm./sec.$^2 = 220$ $g$ (approximately), $g$ being the acceleration of gravity. This means that the coupling liquid is accelerated against the walls of the well hole in the formation 100 times per second and with an acceleration of the order of two hundred and twenty times that of gravity. With any reasonable degree of coupling it is possible to impart sufficient cyclic acceleration to the formation to exceed the pull of gravity locally so that the local formation literally "floats apart in space" because the return wave is never as great as the outgoing wave. The above analyzed accelerations, of course, also impart high stress fatigue conditions.

A specific object of the present invention is the provision of a simple and yet extra powerful system of sonic fracturing of underground oil bearing formation, characterized by location of a generator of sonic waves or vibrations at the ground surface, transmission of such waves deep into the ground via a wave transmission medium located in a deep bore in the earth, and finally radiation of these sonic waves from the lower portion of the wave transmission medium outward and through the formation desired to be fractured.

The system of the invention comprises generally a powerful sonic wave or vibration generator situated at the ground surface, a wave transmission column suspended in a bore hole in the earth for transmitting sonic waves from the generator to a transducer on the lower end of the column, or forming the lower end portion of the column, which transducer is positioned opposite the formation to be fractured, and a body of coupling liquid in the bore hole between the transducer and the walls of the well bore. The transducer translates waves in the column into waves or oscillations in the body of coupling liquid, and the waves or oscillations in the coupling liquid induce sonic waves in the formation around the walls of the bore hole contacted by the body of coupling liquid. These waves in the formation are necessarily, of course, of the necessary amplitude to cause fatigue failure of the formation, as described above.

The system of the invention is further characterized by use of a vibration generator of very high power. A ground surface vibration generator can readily be constructed of larger size and power than can a vibration generator designed to be lowered in the usual bore hole produced by modern deep well drilling equipment, which bore hole may be approximately ten inches in diameter. Extra large power is of course desirable in the first instance in that the area around the well bore within which fracturing is accomplished is thereby increased. In addition, however, at the extra high power levels referred to, various cavitating, shock, and other non-linear, transient or asymmetric wave effects are manifested in the body of acoustic coupling liquid in the bore hole between the sonic wave radiator or transducer and the walls of the bore hole. Such non-linear manifestations are conducive to amplitude peaking of the waves transmitted to and through the formation to be fractured, with the consequence of faster and more effective fracturing of the formation. Such effects appear only at extra high power levels, and are of course qualitatively different in both nature and effect from the sonic waves of a lower order of power such as are produced with other known sonic well devices such, for example, as sonic pumps (Patent No. 2,442,912), or sonic devices for unclogging the formation, or augmenting the migration of well fluids therethrough (Re. 23,381).

The elastic column used to transmit the sonic waves down the bore hole must be of good elastic fatigue properties, and of substantial cross-sectional area, such as affords an allowable stress range corresponding to a wave amplitude in the column which will result in waves in the formation of amplitude suitably exceeding the endurance limit of the formation. The column may consist of a string of fairly heavy pipe, such as steel drill pipe. Pump tubing is too light to transmit the vibratory energy at required power levels.

Preferably, the wave radiator or transducer at the lower end of the wave transmission column consists of a longitudinally vibratory solid steel elastic rod or column of considerable length, typically about 80 feet long, and approximately 8 inches in diameter for an 8⅝ inch well hole. The lower end of this rod acts as the wave radiator or liquid coupler element. It is also possible to utilize for the wave radiator or coupler merely the lower end portion of the wave-transmitting pipe string, closed at its lower end by a suitable cap or plug. If desired, a more or less standard swab cup can be installed at the lower end to increase the coupling effect with the liquid in the bore hole.

The wave transmission column, inclusive of the wave radiator or transducer, may be set into longitudinal standing wave vibration by operating the generator at a frequency in the region of a resonant frequency for the column. It is also one preferred practice of the invention to utilize a frequency which approximates resonance for the transducer when the latter is in the form of a long, solid rod, as above-mentioned and hereinafter specifically described. In the latter case, the rod may be set into a desirable mode of resonant standing wave vibration, either at half wave length, full wave length, or any multiple of a half wave length.

In all cases of wave transmission down the column, the column functions as a wave energy reservoir, storing energy during performance, and releasing energy by sonic wave radiation into the body of coupling liquid on each vibratory stroke of the wave radiator. The utilization of the entire length of the column, from the ground surface to the site to be fractured, as an energy storage reservoir affords the unique advantage of very large energy storage, and operation at high "Q," which stored energy is delivered periodically to the formation, the energy being delivered at any given time being a small fraction only of that stored per cycle. This large energy storage means that successive quantities of energy periodically extracted from the column do not materially drain the vibratory system, which accordingly is permitted to operate at high "Q." (The factor "Q" is of course a known figure of merit of oscillatory systems, being the ratio of oscillatory energy stored to oscillatory energy dissipated per half cycle.) Therefore, it is possible to deliver acoustic wave energy to the formation but at the same time maintain good acoustic wave amplitude and good acoustic coupling throughout the vibratory system.

The invention will be further described with reference to the accompanying drawings showing a present illustrative embodiment thereof, and in which.

Figure 2:
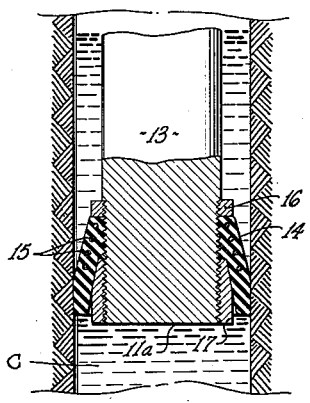
FIG. 2 shows a swab cup liquid coupler installed on the lower end of the column of FIG. 1.

In the drawings, numeral 10 designates generally a well bore which has been drilled into the earth down through the productive formation to be fractured. Suspended in this well bore is an elastic wave transmitting column 11, the lower end 11a of which functions as a sonic wave radiator or coupling means, acting to radiate sonic waves of high energy content via surrounding coupling liquid to the walls of the well bore and thence into the formation. The liquid couples the wave radiator to the formation by transmitting pressure waves thereto, these waves being produced in the liquid by the vibratory motion of the lower end 11a of column 11. In the present illustrative embodiment of the invention, this column 11 is made up of a string of fairly heavy pipe 12, such as drill pipe, stands of which are coupled to one another as at 12a by means of conventional joints, together with a long, steel vibratory rod 13 coupled to the lower end of the string of pipe 12. The rod 13 may be of solid steel, about 80 feet in length, and of a diameter of 8 inches for a bore hole diameter of 8⅝ inches. In this example, the wave radiator or liquid coupling means comprises the lower end 11a of the rod 13. To improve coupling to the liquid, a conventional swab cup 14 may be mounted on the lower end of rod 13, as indicated in FIG. 2. This cup, whose inner portion is reenforced by wire convolutions 15, is mounted on rod 13 between nut 16 and sleeve 17, with its somewhat flexible lip portion in sliding engagement with the walls of the well. The improvement in coupling effect with use of the swab cup arises since, on the downstroke of the lower rod end 11a, when a positive pressure wave is being radiated into the liquid, this pressure wave is prevented by the expanded cup from being partly relieved or dissipated up the bore hole around the rod. Thus the rod end 11a is enabled to "drive" the liquid at higher impedance (ratio of pressure to velocity) and so deliver a stronger wave to the formation. The rubber cup is not subject to appreciable wear, owing to the presence of the liquid, which acts as a lubricant. The conventional swab cup does not fit the well bore so perfectly as to present a problem as regards by-passing any liquid in the well bore during run-in at ordinary run-in rates.

The column 11 is suspended in the bore hole from ground surface equipment, including a vibration or sonic wave generator, one illustrative example of which will now be described. A beam 20 is pivoted at one end, as at 21, on a suitable support 22 rising from an earth supported platform or foundation 23 placed around casing head 39, the central portion of beam 20 being apertured, as at 24, to pass the jointed pipe string or column, and a suitable releasable clamp means such as indicated at 25, being mounted on and secured to the beam, and being adapted for rigid clamping of the pipe string. This clamp means 25, the details of which need not be illustrated, since they may be conventional, comprises, for example, a slip bowl furnished with wedge slips adapted for tight clamping of the pipe string, or a split collar adapted to be tightened about the pipe string, or any other suitable device for tightly clamping the pipe string to the beam. A means for releasably holding the clamp means down to the beam is indicated at 26.

The beam carries, at its free end, a vibration or sonic wave generator 30 designed to produce a vertically directed alternating force. The generator, beam and column are yieldingly supported by compression springs 31 under the free end of the beam and supported on foundation 23. Generator 30 comprises, illustratively, two unbalanced weights 32 on parallel shafts which are connected by spur gears 33, one of the shafts being belt driven from gasoline engine 35. This engine is preferably a torque responsive engine, such as an ordinary carburetor type of internal combustion engine. The two weights are arranged so as to move up and down in unison, so that the unbalanced vertical forces which they generate will be additive, and will be transmitted to beam 20, causing it to oscillate, and to exert a vertical alternating force on the upper end of column 11. Since the rotors turn in opposite directions, horizontal force components are cancelled.

Figure 1:
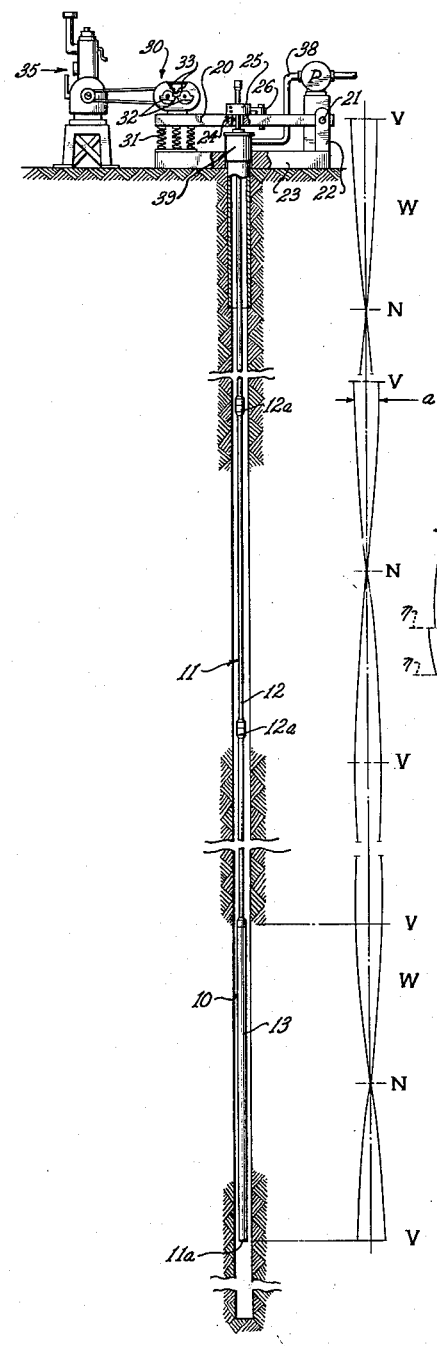
FIG. 1 is a longitudinal sectional view of an earth bore showing apparatus in accordance with the present invention situated therein.

The vertically directed alternating force exerted on the upper end of column 11 sends alternating elastic deformation waves of compression and tension down the column to the lower end thereof where the waves are reflected and transmitted back to the top, creating standing waves in the column. If the frequency of these waves is made such that they arrive back at the top in phase with new waves of like kind being launched down the column, a condition of standing wave resonance is attained. A somewhat idealized wave system is indicated in FIG. 1, wherein a resonant standing wave W is represented conventionally along the side of the column. The distance $a$ in the diagram represents the wave amplitude, which will be seen to vary for different positions along the column. Nodes of the standing wave, where amplitude is minimized, or zero, are indicated at N. Velocity antinodes, where wave amplitude is maximized, are indicated by the letters V. It will be understood that the distance between successive velocity antinodes is a half wave length for the wave system in the column. Attention is further drawn to the fact that the velocity antinodes V are further apart for the pipe string portion of the column than they are for the solid rod 13. In an embodiment of the invention wherein the column is of uniform cross-section from end to end, the velocity antinodes would, of course, be equally spaced throughout the length of the column. In the illustrative system shown, rod 13 vibrates in a half wave length resonant longitudinal standing wave mode. This is accomplished when the wave generator is driven by engine 35 at a frequency which is a fundamental resonant frequency for the length and cross-sectional area of the rod 13. In operation, the engine throttle is set to obtain such resonance, which is manifested to the operator by high vibration amplitude. It should be understood that it is not an essential for half wave length standing wave operation of the rod 13 that a resonant standing wave be established throughout the remainder of the column. Thus, a wave consisting of alternating waves of compression and tension transmitted down the pipe string 12 will exert an alternating force on the upper end of the rod 13 and will set the latter into resonant longitudinal standing wave action if at the resonant frequency of the rod 13.

A great deal of vibratory energy is stored in the column 11 whether or not resonant standing wave performance is established. It is of course true that vibration amplitude is maximized in the region of the antinodes, under conditions of resonant standing wave operation, and it is generally desirable that, when using the illustrative embodiment of the invention, including the solid rod 13, that operation be at a frequency approximating or falling within the resonant range for the rod 13. It is further advantageous to have the entire column operating under conditions of resonant standing wave performance, as diagrammed in FIG. 1, but such ideal performance is not generally essential. In event of the use of a column of uniform cross-section from end to end, however, standing wave resonance for the entirety of the column is easily attained by adjustment of the operating frequency of the generator, it being a simple matter to adjust the frequency of operation to whatever length of column is suspended at any given time in the well bore.

As mentioned in the introductory paragraphs of the specification, a part of the system consists of a body of acoustic coupling liquid located within the well bore between the column 11 and the walls of the well bore. Such coupling liquid, indicated at C in FIG. 2, may be introduced via a pipe line 38 connected into casing head 39 and sent downwardly in the annulus between the walls of the well hole and the column. Also as mentioned preliminarily, it is generally advantageous to operate with a considerable hydrostatic pressure on the body or column of coupling liquid, at least in the region of the wave radiating lower end 11a of the column, and to this end the well bore may in some cases be filled to the ground surface with such coupling liquid. Or, to still further increase hydrostatic pressure, a pump such as diagrammatically indicated at P may be connected into line 38 and operated to increase pressure beyond that available from hydrostatic column pressure alone.

In operation, considering rod or transducer 13 to vibrate in a half wave length standing wave mode, the two half length portions of rod 13 alternately elastically elongate and contract, this occurring at the resonant operating frequency. It will be evident that the lower wave radiating end 11a of the rod will under such conditions move through a relatively short stroke, but with great force and therefore with great output impedance. More broadly, under any type of longitudinal elastic deformation wave action in the column, the lower end thereof 11a will vibrate at the operating frequency through a relatively short displacement distance but with great force, thereby yielding high output impedance, as desired.

The wave generator 30, being located entirely above ground, can readily be constructed to a scale yielding high alternating output force, and it is a feature that the eccentric weights 32 are designed to produce high unbalanced forces, so that high power waves are established in the column. As earlier mentioned, the column is also designed to be relatively heavy and to have a high allowable stress range, so as to accommodate wave amplitudes adequate to result in waves in the formation of such stress as will exceed the endurance limit of the formation.

As mentioned earlier, a body of coupling liquid C is maintained in the bore hole, in contact with the wave radiation surface 11a on the lower end of the column, and this body of coupling liquid is preferably maintained under high hydrostatic pressure. The pressure wave radiated into the coupling liquid from the radiator and transmitted therethrough will be seen to be superimposed on the maintained mean hydrostatic pressure. By having the mean hydrostatic pressure relatively high, the amplitude of the acoustic waves transmitted through the liquid to the walls of the bore hole is established at a correspondingly high level. The impedance of the coupling liquid is also a factor of interest. Using a liquid such as crude oil, the acoustic impedance, while not as high as the output impedance of the wave radiator, or the impedance of the formation itself, is still comparatively high. Moreover, the impedance of the liquid is elevated by reason of the high hydrostatic pressure, which tends to increase the density of the fluid. Further, the impedance of the coupling liquid can be further increased by incorporating therein a proportion of granular solid material, such as sand.

Under the conditions described, a powerful acoustic wave action is set up in and propagated through the formation, an amplitude exceeding the endurance limit of the formation being readily attained. Desired fracturing of the formation proceeds rapidly under these conditions.

Also, under the high power level acoustic waves transmitted through the coupling liquid, liquid cavitation and other non-linear, transient or asymmetric wave effects, including steep front shock waves, are attainable. These effects are conducive to wave peaking, whereby the pressure amplitude corresponding to the endurance limit of the formation may be periodically instantaneously exceeded by a relatively great amount.

An advantageous feature of the present system is that its underground operation may be detected by simply watching the vibratory behavior of the upper end of the pipe string, the oscillating beam, and wave generator. Under conditions of resonance, these parts will oscillate at a maximized amplitude, as may easily be observed. When the system is "loaded," i.e., coupled to the formation and working on unfractured formation, it operates at relatively high "Q." That is to say, the energy storage per half cycle is large relative to the energy dissipated per half cycle. The system "tunes" sharply, and is sensitive to engine speed. When the rock fractures, large frictional energy dissipation occurs, and the Q of the system falls greatly. The two principal manifestations at the ground surface are that vibration amplitude falls, and the system is much less sensitive to engine speed, in that its tuning becomes considerably broader.

In treating a given production zone of substantial vertical dimension, the pipe string may be progressively lengthened and lowered, adding new stands of pipe as required, using conventional derrick equipment. In doing this throughout a considerable vertical interval, some attention may in some cases have to be paid to adjustment of generator frequency to preserve resonance. This may be done by throttling the engine. However, the torque responsive characteristics of a carburetor engine tend to make this regulation automatic. In general, the engine, at fixed throttle, varies its speed in response to the torque demand placed on it. When the engine is driving a load constituting a resonant vibrating member, it experiences an increased torque at the resonant frequency, which holds the engine at a corresponding speed. If resonance frequency falls, the torque peaks at a lower engine speed, and the engine speed lowers accordingly. In the case of a large rod or collar 13 such as here illustrated, caused to vibrate at its own resonant frequency by waves travelling down the pipe string 12, adjustment of frequency, once resonance in member 13 has been established, will in general not be required. In the event that a uniform column should be employed, and that it should be desired to maintain standing wave resonance therein as the column is lengthened, the frequency of the generator may be decreased, by decreasing the speed of engine 35, so as to preserve resonance. Or, with a torque responsive engine, this may occur automatically. In many cases speed regulation of the engine will not be required, or will not occur to any great extent, however, since the added length is often a small percentage of the total length, and operation will not depart very much from the peak of the resonance curve. It is also true, of course, that while resonance is always desirable, and gives optimized performance, it is not always absolutely essential to successful operation; and in many cases, if the system is set up and driven at fixed frequency to attain resonance, and the pipe string is then lengthened and lowered, so that the resonant frequency of the column length as a whole is decreased, the system will still operate successfully even without frequency adjustment.

Note may also be made of the fact that when the equipment has been lowered to a relatively great depth, and the resonant frequency becomes correspondingly low, the prime mover may often advantageously be speeded up to find and operate at a higher harmonic frequency.

Figure 3:
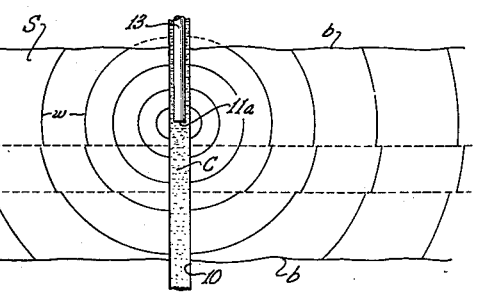
FIG. 3 is a diagrammatic view showing a section of formation surrounding a well bore, with the apparatus of FIG. 1 situated therein.

FIG. 3 is diagrammatically illustrative of a typical application of the invention, the rod 13 being positioned with its lower end opposite an oil bearing formation or bed S between two joints or boundaries b and b' beyond which are assumed to be beds of differing character. The two planes indicated in dotted lines at m and n represent minor bedding planes within the more or less homogeneous production formation or stratum S, and the rock material therebetween may be understood to differ to only a small extent from the remaining portions of the bed S. In other words, the material between the planes m and n may be thought of as having been laid down under slightly different conditions, so that its wave transmission character may be generally similar to that of the remainder of the bed, but still somewhat different therefrom.

The waves generated and propagated within the bed S as a result of the operation of the sound wave generator are indicated by the circles w seen to radiate from the region of the lower end 11a of the column. Waves so radiated into the stratum S between the fractures or bed planes b and b' will be understood to be very largely reflected at said planes because of the substantial acoustic discontinuity caused thereby, and so kept primarily within the main stratum S which is under direct treatment, being radially outward between said planes serving as wave guide boundaries. Because of the assumed close similarity of the rock material between the planes m and n to the remaining material of the bed S, together with an assumed initial bonding of the entirety of the material between the planes b and b', the waves radiating from the region 11a are propagated horizontally outward throughout the entirety of the rock material between the planes b and b'.

It will thus be seen that the bed S may undergo cyclic deformation movements which are not propagated appreciably beyond the planes b and b', so that the layer S is moved and worked relative to the layers beyond the planes b and b', thus opening up or fracturing the formation (breaking the natural bond) along said planes. The material of the bed S, subjected to the described high amplitude cyclic deformation movements, fractures by elastic fatigue failure. In addition, because of inherent weakness of the bond along such bedding planes as m and n, as well as because of differences in the speed of sound in the material between and outside of the planes m and n, as indicated in FIG. 3, fractures are developed along the planes m and n. The forces operating to produce this effect will be understood when it is realized that the waves transmitted through the rock above and below the plane m, for instance, may have a phase difference, meaning that the elastic deformation movements on opposite sides of the separation plane are somewhat out of phase. This condition results in a shearing force along the separation plane, with resulting tendency to fracture the bond. As soon as a fracture should develop along such a plane as m, the radiated waves are then guided between the new boundaries b and m, for example, with materially enhanced energy concentration, and still greater and more extensive fracturing force. The pipe string being gradually lowered, the layers formed by fracturing along such planes as m and n will be seen to be locally treated in succession. The process thus progresses, with greater energy concentration as the layers open up, always tending toward further multiplication and extension of the desired fracturing.

The specific form of apparatus here illustrated and described will be understood to be illustrative of the invention but not restrictive thereon in its broader aspects, various changes in design, construction and arrangement being possible within the broad scope of the invention.

I claim:

1. For use in a system for sonically fracturing oil bearing formation in the earth around a well bore therein by transmitting through the formation acoustic pressure waves of amplitude exceeding the endurance limit of the formation, a long, elastic wave transmission and energy storage column of solid elastic material positioned in the well bore and extending from the ground surface to the region of the formation to be fractured, said column having acoustic coupling means at its lower end for acoustic coupling to a body of surrounding liquid, a body of liquid in said well bore in contact with said coupling means and with the wall of the well bore, and a vibration generator at the ground surface coupled to the upper end portion of said column for applying thereto a vertically-directed alternating force at a resonant frequency of at least a lower section of the column, so that elastic waves are transmitted down said column and thence reflected upwards from the lower end portion thereof in correct phase to establish a longitudinal standing wave in at least said lower column section, and so as to store energy therein, in such manner that said coupling means on said column vibrates at said frequency and sets up acoustic pressure waves of corresponding frequency in said body of liquid, whereby said acoustic waves are transmitted therethrough to the walls of the well bore and thence into the surrounding formation, said vibration generator having a cyclic force output to produce, and said wave transmission column having a cross section to accommodate, an elastic wave amplitude in the column effecting transmission through said body of liquid and into said formation of acoustic pressure waves of amplitude exceeding the endurance limit of the formation.

2. The subject matter of claim 1, wherein said vibration generator is adapted and arranged to operate at a resonant frequency of said wave transmission column as a whole.

3. The subject matter of claim 1, wherein said wave transmission column comprises a pipe string and a solid elastic rod suspended therefrom, and in which the vibration generator is operated substantially at a frequency for longitudinal standing wave resonance in said rod.

4. The subject matter of claim 1, wherein said acoustic coupling means includes a swab cup on the lower end portion of said column in engagement with the walls of the well bore.

References Cited in the file of this patent
UNITED STATES PATENTS

| | | |
|---|---|---|
| 2,554,005 | Bodine | May 22, 1951 |
| 2,670,801 | Sherborne | Mar. 2, 1954 |
| 2,871,943 | Bodine | Feb. 3, 1959 |